(12) United States Patent
Feuillet et al.

(10) Patent No.: US 11,325,504 B2
(45) Date of Patent: May 10, 2022

(54) TRACK FOR SEAT

(71) Applicant: FAURECIA Sièges d'Automobile, Nanterre (FR)

(72) Inventors: Patrick Feuillet, Flers (FR); Olivier Kircher, Saint Georges des Groseillers (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 108 days.

(21) Appl. No.: 16/798,957

(22) Filed: Feb. 24, 2020

(65) Prior Publication Data

US 2020/0269727 A1 Aug. 27, 2020

(30) Foreign Application Priority Data

Feb. 26, 2019 (FR) ...................................... 19 01930

(51) Int. Cl.
*F16M 13/00* (2006.01)
*B60N 2/07* (2006.01)
*B60N 2/08* (2006.01)

(52) U.S. Cl.
CPC ......... *B60N 2/0727* (2013.01); *B60N 2/0715* (2013.01); *B60N 2/085* (2013.01)

(58) Field of Classification Search
CPC .. B60N 2/0727; B60N 2/0881; B60N 2/0868; B60N 2/0705; B60N 2/0806; B60N 2/0825; B60N 2/0818; B60N 2/0715; B60N 2/0875

See application file for complete search history.

(56) References Cited

U.S. PATENT DOCUMENTS

| | | | |
|---|---|---|---|
| 6,354,553 B1* | 3/2002 | Lagerweij | B60N 2/0715 248/429 |
| 6,637,712 B1* | 10/2003 | Lagerweij | B60N 2/0705 248/429 |
| 7,922,143 B2* | 4/2011 | Park | B60N 2/0705 248/429 |

(Continued)

FOREIGN PATENT DOCUMENTS

| | | |
|---|---|---|
| CN | 104428161 A | 3/2015 |
| DE | 4242895 C1 | 11/1993 |

(Continued)

OTHER PUBLICATIONS

First Office Action for Chinese Application No. 202010118878.0 dated Jan. 10, 2022.

*Primary Examiner* — Amy J. Sterling
(74) *Attorney, Agent, or Firm* — Barnes & Thornburg LLP

(57) ABSTRACT

The present disclosure relates to a track for an automotive vehicle seat comprising: a first, upper, rail and a second, lower, rail mounted sliding relative to each other along a sliding axis, that define a cavity between them; a bolt comprising at least one locking member movable from a locked position in which the at least one locking member immobilizes the first rail and the second rail relative to each other, and an unlocked position and a guiding system for the at least one locking member between the first locked position and the second unlocked position, secured to the first, upper, rail, where the guiding system comprises an inner guide secured to the first rail at two anchoring points extending respectively the guide forming body above and below a guiding orifice.

10 Claims, 3 Drawing Sheets

(56) References Cited

U.S. PATENT DOCUMENTS

2008/0163717 A1\* 7/2008 Weber ................. B60N 2/0705
  74/527
2019/0193595 A1\* 6/2019 Jang ..................... B60N 2/0875

FOREIGN PATENT DOCUMENTS

DE 102015010017 A1 2/2017
KR 20110133689 A 12/2011

\* cited by examiner

TRACK FOR SEAT

PRIORITY CLAIM

This application claims priority to French Application No. FR 19 01930, filed Feb. 26, 2019, which is expressly incorporated by reference herein.

BACKGROUND

The present disclosure relates to an improved track for automotive vehicle seat, and also a seat comprising such a track. More particularly, the present disclosure relates tracks connecting the structure of the seat to the floor of the vehicle, and more specifically of tracks which can be manually unlocked to allow the adjustment of the position of the seat along the sliding axis of the track.

SUMMARY

According to the present disclosure, a track for a vehicle seat, with a guiding system with at least one locking member comprising an inner guide, with maximized safety during an impact.

In illustrative embodiments, a track for a vehicle seat, with a guiding system with at least one locking member comprising an inner guide, with maximized safety during an impact is provided.

In illustrative embodiments, a track designed such that the assembly of the bolt, in particular of the inner guide to the upper rail of the track, even the attachment of an outer guide, and more generally the assembly of the bolt is made easier by it.

In illustrative embodiments, a track for an automotive vehicle seat comprising:

a first, upper, rail and a second, lower, rail mounted sliding relative to each other along a sliding axis, that define a cavity between them oriented longitudinally along the sliding axis;

a bolt comprising:

at least one locking member movable from a locked position in which the at least one locking member immobilizes the first rail and the second rail relative to each other, and an unlocked position in which the at least one locking member allows the first rail and the second rail to slide relative to each other; and a guiding system for the at least one locking member between the first locked position and the second unlocked position, secured to the first, upper, rail; and wherein the guiding system comprises an inner guide, arranged inside the cavity and secured to the first rail, where the inner guide comprises a body with a guiding opening configured in order to allow the guiding of the at least one locking member between the locked and the unlocked position.

In illustrative embodiments, the inner guide is anchored on the first, upper, rail near:

at least one first anchoring point for which the first rail has at least one assembly opening receiving as insert a complementary assembly part from the body of the inner guide, where the assembly part extends the body above the guiding opening;

at least one second anchoring point, with position laterally offset relative to the at least one first anchoring point for which the body of the inner guide has at least one attachment part extending the body below the guiding opening, where the attachment part is fixed to the first rail.

Thus, the body of the inner guide is held, on both sides of the at least one guiding opening, from above and below it, because of the first anchoring point and the second anchoring point. Such anchoring improves the hold of the inner guide and allows a better transfer of the forces, thus limiting the risk of deformation of the inner guide. The hold is applied above and below the guiding opening(s).

In illustrative embodiments, the characteristics disclosed in the following paragraphs can, optionally, be implemented. They can be implemented independently of each other or in combinations with each other:

the at least one attachment part having a mounting opening, the inner guide is secured to the first rail by an attachment member passing through the at least one mounting opening and a corresponding opening of the first rail near the second anchoring point;

the first, upper, rail having an upper wall and at least one lateral wall extending the upper wall, and wherein the at least one anchoring point is made on the upper wall of the first rail and the at least second anchoring point is made on the lateral wall of the first rail;

the guiding system comprises an outer guide, outside the cavity, secured to the first upper rail, comprising at least one guiding opening for the at least one locking member and wherein the at least guiding opening for the outer guide and the guiding opening for the inner guide respectively provide the guiding of the blocking member following two positions offset along a longitudinal axis of the blocking member;

the outer guide has at least one mounting opening, where the outer guide is secured to the first rail via an attachment member passing through the at least one mounting opening and a corresponding opening of the first rail;

the attachment member passing through the at least one mounting opening of the inner guide and the first rail, on the one hand, and the attachment member passing through the mounting opening of the outer guide and the first rail, on the other hand, are a single attachment member simultaneously providing the attachment of the inner guide and the outer guide to the first rail;

the bolt comprises a command lever, that engages with the at least one locking member and is configured for moving the at least one locking member from the locked position thereof to the unlocked position thereof when manually actuated;

the body of the outer guide comprises a support part on which the command lever is pivotably hinged;

the at least one supplemental assembly part comprises at least one tooth, projecting to the upper part of the body of the inner guide, and the assembly opening is a slit, receiving the tooth in the nesting play;

the body of the inner guide is a metal sheet cut to form at least the supplemental part received as insert, and also the at least one guiding opening for the locking member;

the section of the sheet metal bearing the at least one guiding opening has at least reinforcing bends, at one of the ends of the sheet metal along the sliding axis, even two reinforcing bends on either side of the at least one guiding opening;

the track comprises two the first anchoring points with positions offset along the sliding axis of the track, with two assembly openings for the first rail, receiving respectively as inserts two complementary assembly parts of the body of the inner guide;

the track comprises two the second anchoring points, with positions offset along the sliding axis, where the body of the inner guide has two attachment parts each extending the body below the at least one guiding opening, where the two attachment parts are separated by a recess allowing passage (without guiding) of the at least one locking member.

In illustrative embodiments, the cut sheet metal of the inner guide is folded having, along the sliding axis, a U-shaped section, including:

a first section part bearing the at least one attachment part bearing on a lateral wall of the upper rail, including the mounting opening through which passes the attachment member, where the at least attachment part is configured for providing the at least one second anchoring point;

a second section part, offset laterally along a direction perpendicular to the sliding axis of the track, bearing the at least one guiding opening, and also the complementary part received as insert in the assembly opening, configured for providing the at least one first anchoring point;

a third section connecting the first section part and the second section part to the lower part thereof.

In illustrative embodiments, an automotive vehicle seat comprising at least one track according to the present disclosure, even two tracks according to the present disclosure.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of the track conforming to the present disclosure, according to an embodiment;

FIG. 2 is a section view along a plane perpendicular to the sliding axis of the track more specifically showing an inner guide and an outer guide for guiding the locking members, each in two positions offset along the longitudinal axis of the locking member, where the inner guide is notably anchored in two anchoring points laterally offset, including at least one first anchoring point on the upper wall of the first, upper, rail by engaging an opening of the upper rail with a complementary part of the inner guide received as insert, and at least one second anchoring point, on the lateral wall of the first rail, by use of an attachment member such as a rivet;

DETAILED DESCRIPTION

Figure 1:
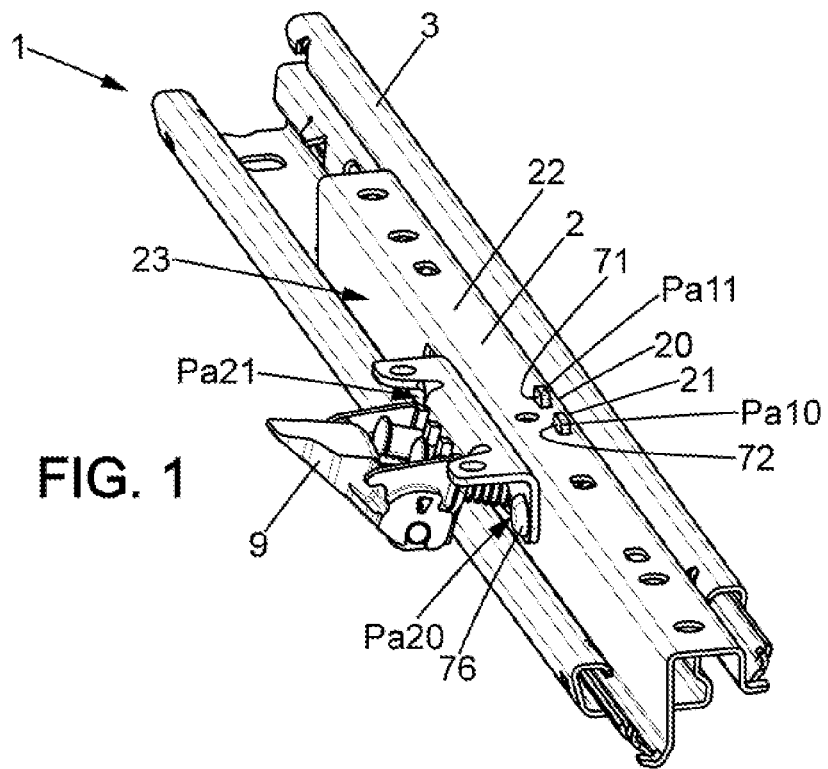

The present disclosure relates to a track 1 for an automotive vehicle seat comprising: a first, upper, rail 2 and a second, lower, rail 3 mounted sliding relative to each other along a longitudinal direction, where a cavity C is defined between them oriented longitudinally along the sliding axis of a track; and a bolt.

The bolt comprises at least one locking member 4, 5, 6 movable from a locked position in which the at least one locking member immobilizes the first rail and the second rail relative to each other, and an unlocked position in which the at least one locking member allows the first rail and the second rail to slide relative to each other; and—a guiding system 7, 8 for the at least one locking member 4, 5, 6 between the first locked position and the second unlocked position, secured to the first, upper, rail; and wherein the guiding system comprises an inner guide 7, arranged inside the cavity C and secured to the first rail 2 and possibly an outer guide 8 also attached to the first rail.

The first, upper, rail 2 and the second, lower, rail 3 can each be made up by a profiled section oriented along the sliding axis of the track. The two longitudinal edges of the profiled section of the first rail and the two longitudinal edges of the profiled section of the lower rail can be curved so as to be respectively nested, by pairs. Bearing members, such as the ball-bearings, can be provided between the longitudinal edges of the nested profile sections, and provided in order to help the sliding.

The first, upper, rail 2 has a substantially horizontal upper wall 22, with openings for attachment members to pass such as screw/nut assemblies and intended to provide the attachment of the first rail to the seat cushion structure of the vehicle seat. The first rail 2 can have a vertical, lateral wall 23 extending (downward) the upper wall 22 and on which the outer guide 8 comes to attach.

The bolt can have several locking members 4, 5, 6, for example three of them, typically in the form of latching plugs arranged parallel to each other along the longitudinal axis thereof.

The inner guide 7, arranged in the cavity C, comprises a body with at least one guiding opening 70 configured to allow the guiding of the at least one blocking member 4, 5, 6 between the locked position and the unlocked position. The outer guide 8, arranged outside also comprises a guiding opening 80 configured to allow the guiding of the at least one blocking member 4, 5, 6 between the locked position and the unlocked position.

The blocking members are arranged such that the longitudinal axis thereof is substantially orthogonal to the sliding axis of the track 1. Each guiding opening 80 of the outer guide 8 and each guiding opening 70 of the inner guide 7 (arranged on the same axis) respectively provide the guiding of the blocking member 4; 5 or 6 along two positions offset along the longitudinal axis of the blocking member 4.

Figure 3:
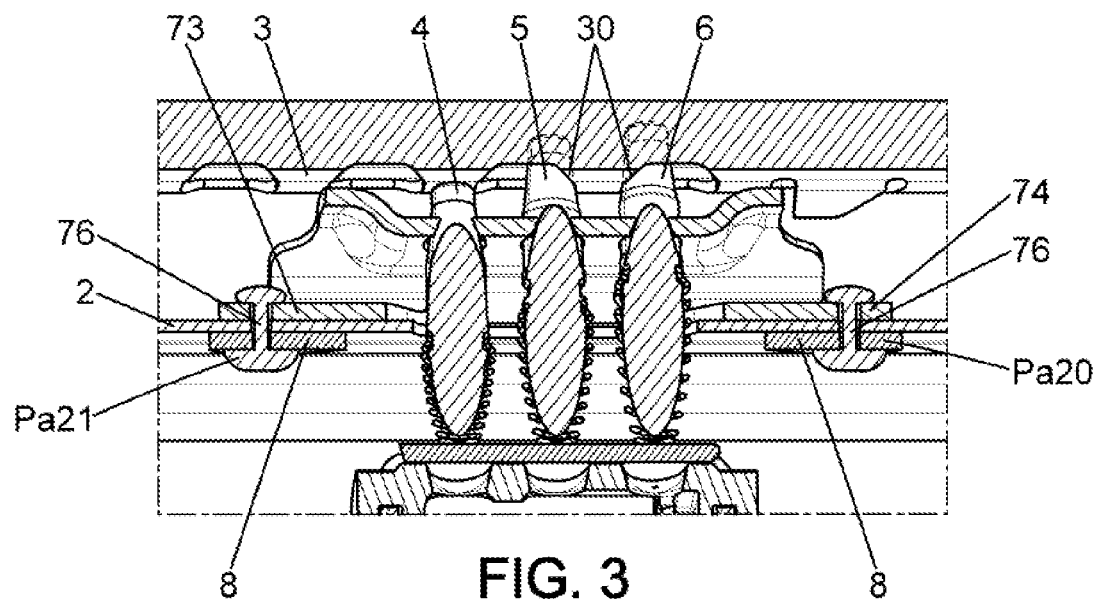
FIG. 3 is a section view, along a horizontal plane parallel to the sliding axis of the track, showing notably the presence of two rivets each passing through three facing openings belonging respectively to the outer guide, the inner guide and the first rail for simultaneously providing the attachment of the inner guide and the outer guide to the first rail.

In the locked position, the distal end of the at least one locking member 4, 5, 6 penetrates into a locking opening 30 of the second, lower, rail 3, immobilizing the sliding between the first rail 2 and the second rail, and as can be seen in FIG. 3. In the unlocked position, the at least one locking member is retracted into a position in which the distal end of the locking member is withdrawn from this locking opening 30, allowing sliding between the first rail 2 and the second rail 3.

The second, lower, rail 3 can thus have a plurality of blocking openings 30 distributed, preferably uniformly, along the sliding axis of the track 1, and on a lateral wall thereof. In the case where the bolt has several locking members 4, 5, 6, such as for example three, the separation between two consecutive locking members can be different from the separation between two consecutive locking openings 30. In this way it is possible to get a number of locking positions of the second rail on the first rail that is greater than the number of locking openings 90, and along an adjustment step less than the separation between two consecutive locking openings 30. In the locked position, only some of the locking members penetrate the locking openings. For example and in FIG. 3, the two locking members labeled 5 and 6 (on the right) penetrate two corresponding locking openings 30 of the second rail to provide the locking, and then the locking member labeled 4 (on the left) comes to stop on the inner wall of the second rail.

The bolt can comprise a command lever 9, engaging with the at least one locking member 4, 5, 6 and configured for moving the locking member 4 from the locked position thereof to the unlocked position thereof when the lever is manually actuated. This command lever 9 can be hinged on the body of the outer guide itself. The body of the outer guide 8 then comprises a support part on which the command lever 9 is pivotably hinged around an axis of rotation typically substantially parallel to the sliding axis of the track.

The lever can have a gripping part, suitable for hooking onto the proximal end of each locking member 4, 5, 6. It is noted that each latching plug passes through a corresponding gripping opening of the lever, with a shoulder present at the proximal end of the plug. When the command lever 9 is lowered, the shoulder of the plug comes to stop against the gripping part of the lever, driving it with the withdrawal thereof from the locked position to the unlocked position of the at least one locking member.

In contrast, the command lever 9 does not drive the locking member 4; 5; 6 in the opposite direction (i.e. following locking). An elastic means constrains the locking member in the locking direction. For example and in the figures, each locking member 4, 5, 6 comprises a compression spring 10 mounted around the latching plug; this compression spring 10 bears against the body of the outer guide 8 at one of the ends thereof and on a circular rib projecting from the latching plug at the other end thereof, in order to constrain the latching plug in the locking direction.

An elastic means can be provided for keeping the command lever 9 in the high position thereof, against gravity: such a means can comprise a torsion spring one end of which is bearing on the command lever 9 and another end of which is bearing on the body of the outer guide 8.

Figure 2:
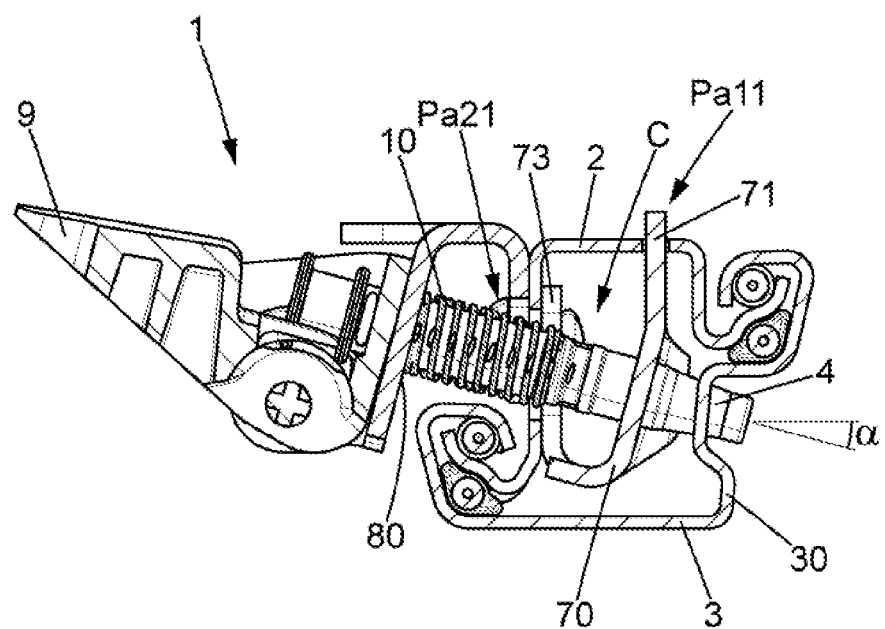

The longitudinal axis of the locking member 4, 5, 6 can be horizontal, or again advantageously inclined relative to the horizontal, for example by an angle less than 45°: note that in FIG. 2 each latching plug is, with reference to the longitudinal axis thereof, inclined relative to the horizontal at an angle included for example between 5 and 30°.

The present disclosure, however, looks at improving the guiding system 7, 8 of the locking member, and more specifically improving the inner guide 7 which takes up a substantial part of the force transmitted by the one or more of latching plugs in case of impact, during an accident. For example, and during a frontal impact, the guiding system must retain the seat and with it the force generated by the abrupt deceleration.

Notably, and according to the present disclosure, the inner guide 7 is anchored on the first, upper, rail near: at least one first anchoring point Pa10, Pa11 for which the first rail has at least one assembly opening 20, 21 receiving as insert a complementary assembly part 71, 72 from the body of the inner guide, where the assembly part extends the body above the guiding opening 70; at least one second anchoring Pa20, Pa21 point, with position laterally offset relative to the at least one first anchoring point Pa10, Pa11 for which the body of the inner guide has at least one attachment part 73, 74 extending the body above the guiding opening 70, and fixed to the first rail 2.

Thus, and as can be understood from FIG. 3, the body of the inner guide 7 is held on both sides of the guiding opening 70, from above and below it, because of the first anchoring point and second anchoring point. Such anchoring improves the hold of the inner guide and allows a better transfer of the forces, thus limiting the risk of deformation of the inner guide 7: In other words, the hold is done above and below the guiding openings 70 and not only above as is done in another example in which the inner guide is anchored to the upper profiled section of the track, solely above the guiding openings, by the upper edge thereof.

It will be noted that the at least one first anchoring point is easily obtained by simple insertion of the assembly part 71, 72 in the complementary shape assembly opening 20, 21, which makes placement of the inner guide easier.

According to an embodiment, the at least first anchoring point Pa10, Pa11 is made on the upper walls 22 of the first, substantially horizontal, rail 2, then the at least second anchoring point Pa20, Pa21 is made on the lateral wall 23 of the first rail 2, inclined relative to the upper walls 22 such as in particular vertical.

According to an embodiment, the at least one attachment part 73, 74 of the guide has a mounting opening 75, where the inner guide 7 is secured to the first rail 2 by an attachment member 76 passing through the at least one mounting opening 75, and also a corresponding opening of the first rail 2 near the second anchoring point Pa20, Pa21.

According to an embodiment shown, the inner guide 7 has two attachment parts 73, 74, where each bears a mounting opening 75 for example at both ends of the inner guide 7 when oriented along the sliding axis of the track. Two attachment member 76 pass through the two openings 75 of the inner guide 7 to provide for the attachment of the inner guide 7 to the first, upper, rail 2. Once the one or more attachment members 76 are in place, which results in two the second anchoring points Pa20, Pa21, the at least one assembly part 71, 72 of the inner guide 7 is locked inserted in the assembly opening by simple nesting.

The at least one supplemental assembly part 71, 72 can comprise at least one tooth, projecting to the upper part of the body of the inner guide 7, and the assembly opening 20, 21 can comprise at least one slit, receiving the tooth in the nesting play. According to an embodiment, the track can comprise two the first anchoring points Pa10, Pa11 with positions offset along the sliding axis of the track 1, with two assembly openings 20, 21 for the first rail 2, receiving respectively as inserts two complementary assembly parts 71, 72 of the body of the inner guide 7. Thus and in FIG. 1, the presence can be seen of two teeth received in two slits forming the two assembly openings 20 and 21, thus resulting in the two first anchoring points Pa10, Pa11 with positions offset along the siding axis of the track.

According to an embodiment, the body of the inner guide 7 is a metal sheet cut to form at least the complementary part 71, 72 received as insert, and also the at least one guiding opening 70 for the locking member 4. Thus the aforementioned tooth and the guiding opening, typically circular, are obtained by cutting the metal sheet.

The sheet metal cut for the inner guide 7 can be folded, so as to have a U-shaped section, when seen along the sliding axis of the track.

This U-shaped section is broken down along the following three section parts, and as can be understood from FIG. 2: a first section part bearing the at least one attachment part 73, 74 with the mounting opening 75, where the attachment part 73, 74 is bearing on the inside on the lateral walls 22 of the first, upper, rail 2; the attachment member 76 passes through the mounting opening 75, where the attachment part is configured for providing the at least one second anchoring point Pa20, Pa 21; a second section part, offset laterally along a direction perpendicular to the sliding axis of the track, bearing the at least one guiding opening 70, and also the complementary part 71, 72 received as insert in the assembly opening 20, 21, configured for providing the at least one first anchoring point Pa10. Pa11; a third section connecting the first section part and the second section part to the lower part thereof.

Figure 4:
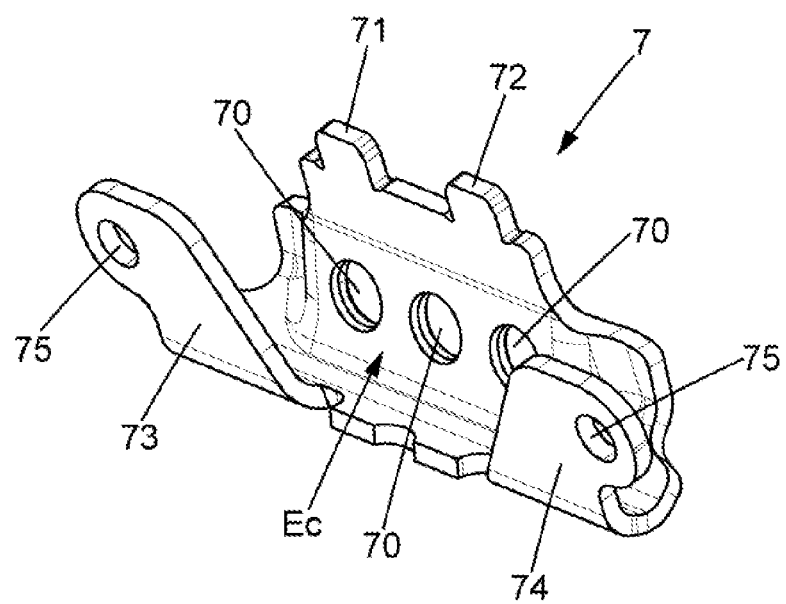
FIG. 4 is a perspective and detailed view of the inner guide, in folded sheet metal form and U-shaped section, when seen along the sliding axis of the track.

Thus and in the detail view from FIG. 4, it can be seen that: the first section part comprises two attachment parts 73 and 74, each in the form of a tab with a mounting opening 75, where the two attachment parts 73 and 74 are arranged at the two ends of the body of the inner guide 7, along the sliding direction of the track, thus resulting in two the second anchoring points Pa20, Pa21, with positions offset along the sliding axis: a large recess Ec is provided between the two tabs forming the two attachment parts 73 and 74, where the recess Ec allows the passage (without guiding) of three locking members 4, 5, 6 in form of latching plugs; the second section part comprises the sheet metal portion bearing the guiding openings 70 for the locking members, and in the case at hand three guiding openings 70 that are circular and uniformly distributed along the sliding axis of the track. This second portion part can be oriented for inclining each latching plug along the previously defined angle α. This second sheet metal part also bears the at least one complementary part 71, 72, in particular in the form of a tooth projecting vertically upward, and which is received as insert in an assembly opening 20, 21 of the first rail 2, in the form of a slit: the second part can also have two assembly parts 71, 72, and in particular two projecting teeth, thus resulting in two first anchoring points Pa10, Pa11 with positions offset along the sliding axis of the track, the third part is a bent section connecting, by extending them, the lower part of the first section part and the second section part of the sheet metal.

With the same objective of improving the inner guide 7, note that the section of the sheet metal bearing the at least one guiding opening 70, has at least one reinforcing bend CR, at one at least of the ends of the sheet metal, along the sliding axis.

Figure 5:
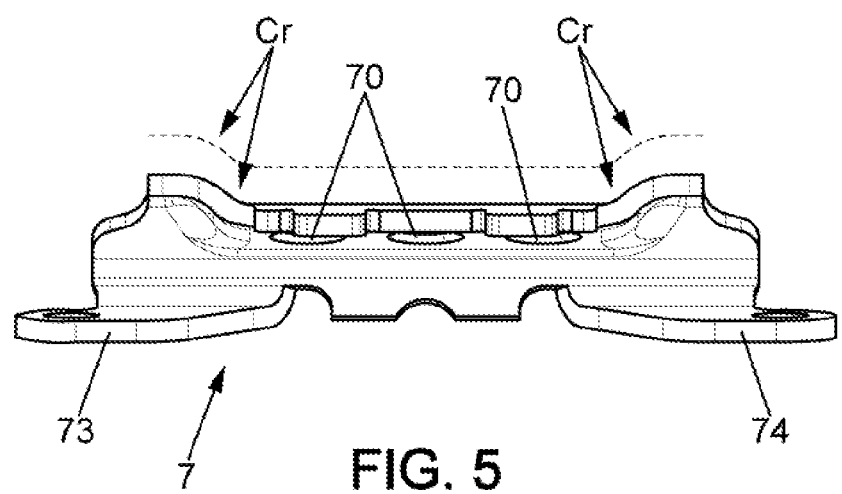
FIG. 5 is an inner guide top view, showing more specifically reinforcing bendings at the longitudinal ends thereof, where the trajectory of the bending is shown in dotted line.

Such a bend is visible as seen in FIG. 5, where the trajectory thereof is represented by the dashed line. It is thus seen that the second section part of sheet metal has, at the two ends of the inner guide 7 along the sliding axis of the track, two reinforcing bends CR, arranged on both sides of the guiding openings 70. The continuous trajectory of the sheet metal taking up these two bends CR takes on, seen from above, the drawing of a shape of the gendarme's hat, and as shown by the dashed lines.

Figure 6:
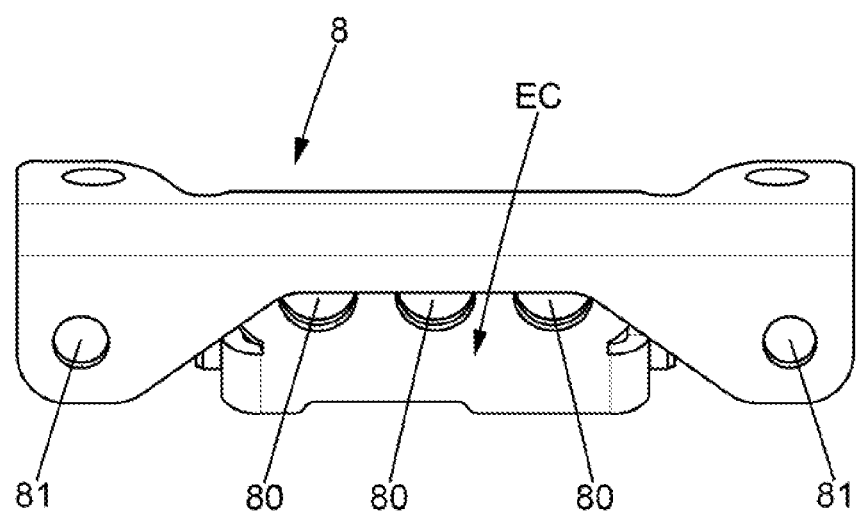
FIG. 6 is a perspective view of the outer guide, where the body of the outer guide again serves as support for the control lever for the bolt.

The outer guide 8 is visible in FIG. 6, as a nonlimiting example. It can have the form of a metal sheet cut and folded, substantially in inverted U shape when seen along the sliding axis of the track, and as can be seen in FIG. 2. The section of the sheet metal can be broken down as: a first section part of the guide 8 which bears two attachment tabs with a mounting opening 81 for each, where the attachment tabs are bearing on the outer surface of the lateral wall 23 of the first rail: the separation between the mounting openings 81 of the outer guide is identical to that between the mounting opening 75 of the inner guide 7. The two attachment members 76, in particular the two rivets, allow the simultaneous attachment of the inner guide 7 and the outer guide 8 to the lateral wall of the rail: thus each attachment member 76 passes successively through the mounting opening 81 of the inner guide 8, an opening of the first rail 2 and the mounting opening 75 of the inner guide. A large recess Ec separates the two attachment tabs allowing the passage (without guiding) of three locking members 4, 5, 6 in form of latching plugs; a second section part, laterally offset toward the outside relative to the first part, and bearing the guiding openings 80, in particular three in the example: this section can be oriented for inclining each latching plug along the previously defined angle α; a third section part connecting the first part and the second part by the top part thereof by extending them.

When the bolt takes up a part of the impact during an accident, a significant force is transmitted by the latching plugs to the guiding system and in particular to the inner guide. In some comparative examples, this inner guide essentially has the shape of a metal sheet having guiding openings, where this sheet is fixed to the upper rail, only by its upper edge, above the guiding openings.

The fact that the attachment of the inner guide to the upper rail is uniquely done above guiding openings (between the upper edge of this sheet metal and the under surface of the upper rail) is not ideal in terms of transfer of the forces during an impact, in that the sheet metal can be deformed, and in particular crumple under the shearing forces imposed by the latching plugs during an impact.

In one comparative example, a track is recognized which comprises an upper rail, made up of a first profiled section, intended to be fixed to the seat structure secured to the seat cushion, and a lower rail made up of a second profiled section, attached to the floor of the vehicle by attachment members. The longitudinal edges of the two profiled sections are curved back in order to form the bearing tracks for the ball-bearings thus allowing the sliding of the upper rail along the lower rail. A bolt comprising locking members, in this case three latching plugs: such a bolt is movable from a locked position in which the locking members immobilize the first rail and second rail relative to each other, and an unlocked position in which the locking members are retracted from locking openings secured to the lower rail, and in that way allow the first rail and the second rail to slide relative to each other.

This bolt comprises a guiding system for the latching plugs which comprises an inner guide, attached to the upper rail, arranged inside a longitudinal cavity defined between the two rails and an outer guide, also fixed to the upper rail on the outer surface thereof. The outer guide and the inner guide comprise, for each latching plug, respectively two guiding openings which guide the latching plug between two guiding positions offset along the length of the plug. The command lever is pivotably hinged on the outer guide, and engages with a shoulder of an expanded head at the proximal end of each plug.

When manually actuated downward, this lever serves to command the bolt from the locked position thereof in which the plugs at least partially enter into the locking openings of the lower rail to the unlocked position wherein the plugs are retracted from these locking openings, thus allowing the sliding of the upper rail along the lower rail.

The invention claimed is:
1. A track for an automotive vehicle seat comprising:
a first upper rail and a second lower rail mounted for sliding movement relative to each other along a sliding axis, the first and second rails defining a cavity between them;

the first rail has a horizontal upper wall, and a vertical lateral wall extending downward from the upper wall, a bolt comprising:

at least one locking member movable from a locked position in which the at least one locking member immobilizes the first rail and the second rail relative to each other, and an unlocked position in which the at least one locking member allows the first rail and the second rail to slide relative to each other, said at least one locking member having a longitudinal axis which is inclined relative to the horizontal upper wall by an angle α less than 45°, said at least one locking member going through said vertical lateral wall; and a guiding system for the at least one locking member between the locked position and the unlocked position, the guiding system being secured to the first rail;

wherein the guiding system comprises an inner guide, arranged inside the cavity and secured to the first rail, wherein the inner guide comprises a body with a guiding opening configured to allow the guiding of the at least one locking member between the locked position and the unlocked position, wherein the inner guide is anchored on the first rail near:

at least one first anchoring point on the horizontal upper wall for which the first rail has at least one assembly opening receiving a complementary assembly part from the body of the internal guide, wherein the assembly part extends the body above the guiding opening;

at least one second anchoring point, with a position laterally offset relative to the at least one first anchoring point for which the body of the inner guide has at least one attachment part extending the body below the guiding opening, and fixed to the first rail, the attachment part having a mounting opening, wherein the inner guide is secured to the vertical lateral wall of the first rail by an attachment member passing through the at least one mounting opening and a corresponding opening of the first rail near the second anchoring point;

wherein the body of the inner guide is a metal sheet cut to form at least the complementary part and the guiding opening, the cut sheet metal of the inner guide is folded having, along the sliding axis, a U-shaped section, including:

a first section part bearing the at least one attachment part with the mounting opening, wherein the attachment part is bearing on said vertical lateral wall of the first rail, wherein the attachment member passes through the mounting opening and is configured to provide the at least one second anchoring point;

a second section part, offset laterally along a direction perpendicular to the sliding axis of the track, bearing the at least one guiding opening and the complementary part received in the assembly opening on the horizontal upper wall, and configured to provide the at least one first anchoring point; and a third section connecting the first section part and the second section part to the lower part thereof, wherein the guiding system comprises an outer guide, outside the cavity, secured to the first rail, and comprising at least one guiding opening for the at least one locking member, and wherein the guiding opening for the outer guide and the guiding opening for the inner guide respectively provide the guiding of the at least one locking member following two positions offset along the longitudinal axis of the at least one locking member, on both sides of the vertical lateral wall of the first rail, inside and outside said cavity, the guiding opening for the outer guide and the guiding opening for the inner guide being oriented for inclining the longitudinal axis of said at least one locking member at said angle α.

2. The track of claim 1, wherein the outer guide has at least one mounting opening, where the outer guide is secured to the first rail via an attachment member passing through the at least one mounting opening and a corresponding opening of the first rail.

3. The track of claim 2, wherein the attachment member passing through the at least one mounting opening of the inner guide and the first rail and the attachment member passing through the mounting opening of the outer guide and the first rail are a single attachment member simultaneously providing the attachment of the inner guide and the outer guide to the first rail.

4. The track of claim 3, wherein the bolt comprises a command lever, that engages with the at least one locking member and is configured for moving the at least one locking member from the locked position thereof to the unlocked position thereof when manually actuated.

5. The track of claim 1, wherein the body of the outer guide comprises a support part on which the command lever is pivotably hinged.

6. The track of claim 5, wherein the complementary assembly part comprises at least one tooth, projecting to the upper part of the body of the inner guide, and the assembly opening is a slit, receiving the tooth in the nesting play.

7. The track of claim 1, wherein the section of the sheet metal bearing the at least one guiding opening, has at least one reinforcing bend, at of the ends of the sheet metal, along the sliding axis.

8. The track of claim 7, comprising two first anchoring points with positions offset along the sliding axis of the track, with two assembly openings for the first rail, receiving respectively as inserts two complementary assembly parts of the body of the inner guide.

9. The track of claim 8, comprising two second anchoring points, with positions offset along the sliding axis, where the body of the inner guide has two attachment parts each extending the body below the at least one guiding opening and separated by a recess allowing passage without guiding of the at least one locking member.

10. A vehicle seat comprising a seat cushion structure and at least one track of claim 1, and wherein the first rail of the track is attached to the seat cushion structure.

* * * * *